United States Patent [19]
Brown

[11] Patent Number: 4,972,742
[45] Date of Patent: Nov. 27, 1990

[54] LUG NUT REMOVAL TOOL

[76] Inventor: Larry J. Brown, Rte. 3, Lot 68, Liberty Village, Liberty, Mo. 64068

[21] Appl. No.: 421,377

[22] Filed: Oct. 13, 1989

[51] Int. Cl.⁵ ............................................. B25B 23/00
[52] U.S. Cl. ..................................... 81/462; 81/180.1
[58] Field of Search ........................ 81/52, 462, 180.1

[56] References Cited

U.S. PATENT DOCUMENTS

| | | | |
|---|---|---|---|
| 2,477,919 | 8/1948 | Telgen | 81/462 |
| 3,097,550 | 7/1963 | Johnston | 81/462 |
| 3,832,917 | 9/1974 | Feith | 81/462 |
| 4,625,600 | 12/1986 | Koren et al. | 81/180.1 X |

FOREIGN PATENT DOCUMENTS 2338457 2/1975 Fed. Rep. of Germany ........ 81/462

Primary Examiner—James G. Smith
Attorney, Agent, or Firm—Kokjer, Kircher, Bradley, Wharton, Bowman & Johnson

[57] ABSTRACT

A lug nut removal tool has an upright support leg on a base, a clamp which can be adjusted up and down on the leg, a pivot bracket on the clamp, and a lug wrench mounted for axial sliding and rotation on the pivot bracket. The stand formed by the support leg and base holds the lug wrench at the proper elevation to be applied to lug nuts on a wheel, and and elongated handle on the wrench allows the wrench to be easily turned while applied to the lug nuts. The leg, wrench bar and handle can be pivoted to positions parallel to one another to provide for compact storage of the tool when it is idle.

14 Claims, 1 Drawing Sheet

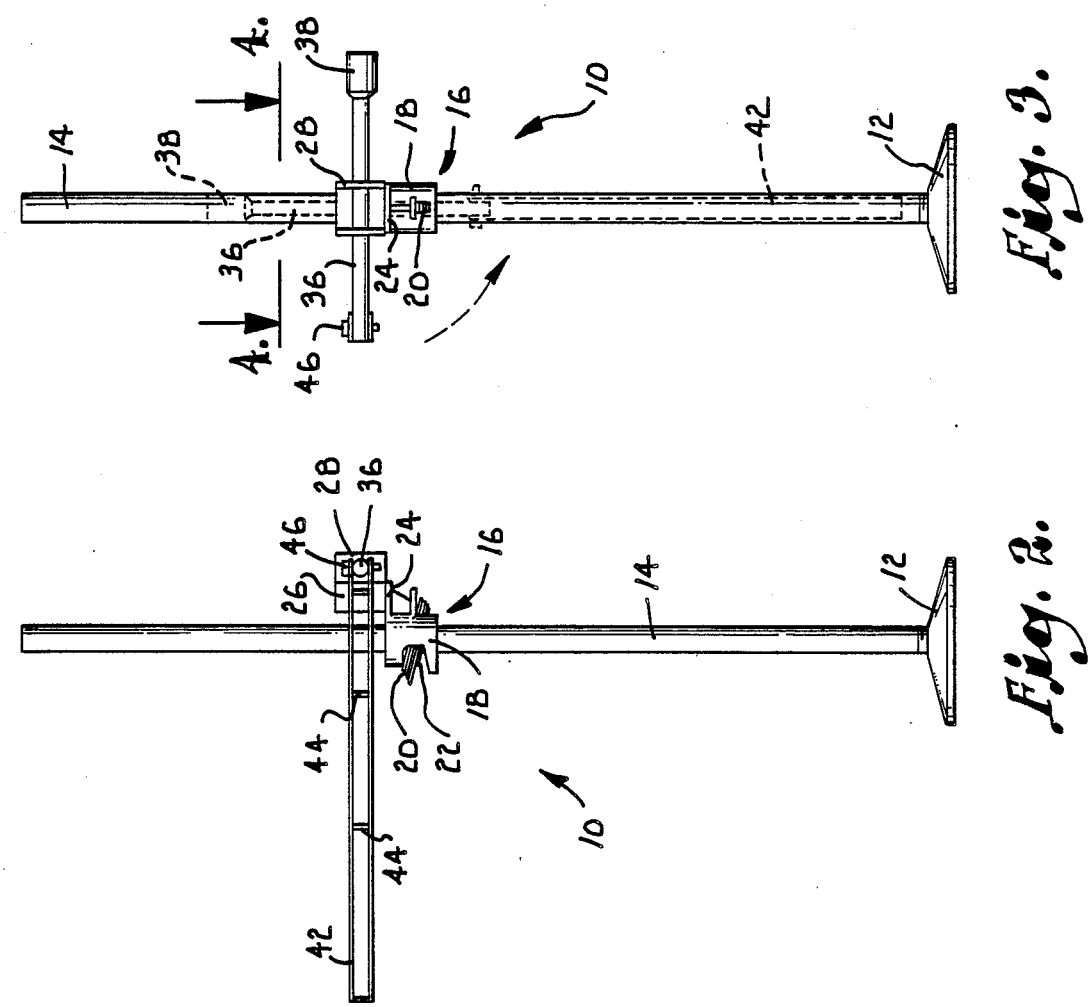
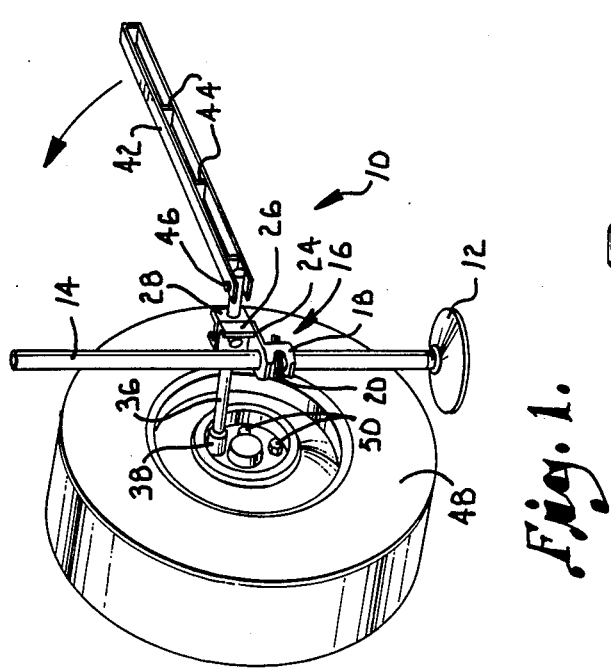
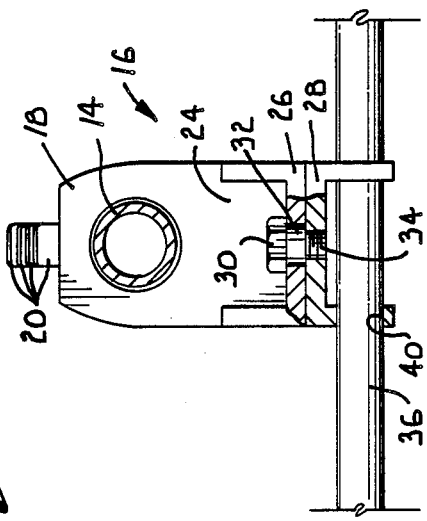

LUG NUT REMOVAL TOOL

BACKGROUND AND SUMMARY OF THE INVENTION

This invention relates in general to lug wrenches and more particularly to a lug wrench that is mounted on an upright stand in order to facilitate use of the wrench in removing and installing lug nuts.

In the event of flat tire on an automobile or other vehicle, it is necessary to remove the wheel and replace it with a spare, and this in turn requires that the lug nuts which hold the wheel on the axle be removed and replaced. The use of conventional lug wrenches can be rather difficult for many persons, particularly older persons and others who lack the physical strength necessary to apply the wrench to the lug nut and hold it firmly in place while the wrench is turned to tighten or loosen the nut.

The present invention is directed to an improved lug wrench which has the advantage of being mounted on a stand so that the wrench is supported on the stand and can be raised or lowered to the proper height for application to the lug nuts. In accordance with the invention, the stand includes a support leg having a base on one end which permits it to be applied in a stable manner to the ground or roadway with the leg in an upright posture. A clamp on which the lug wrench is mounted is slidable on the leg and may be adjusted to the proper height of the wrench and then released so that the wrench is thereafter securely held in place by clamping action. The wrench may then be applied to the lug nuts, and a handle portion of the wrench may be turned in order to loosen or tighten the nuts as required.

In this fashion, the stand holds the wrench at the proper height so that the user must only turn the wrench handle and is not required to hold the wrench on the lug nuts at the same time. Thus, the physical exertion and dexterity required to remove and install lug nuts is reduced significantly in comparison to conventional tire irons and four way type wrenches.

It is particular feature of the invention that the tool can be stored in a compact position when not in use. The wrench bar is carried on a pivot bracket which serves both to facilitate application of the wrench head to the lug nuts and to permit the wrench bar and handle to be oriented parallel to the support leg in the storage position of the tool. The handle is pivoted to the wrench so that it provides leverage when the lug nuts are tightened or loosened and also so that it can be folded in a compact fashion to the storage position of the tool.

DESCRIPTION OF THE DRAWINGS

In the accompanying drawings which form a part of the specification and are to be read in conjunction therewith and in which like reference numerals are used to indicate like parts in the various views:

FIG. 1 is a perspective view showing a lug nut removal tool contructed in accordance with a preferred embodiment of the present invention applied to remove the lug nuts from a wheel;

FIG. 2 is a side elevational view of the lug nut removal tool shown in FIG. 1, with the handle rotated through an arc of 180° relative to the FIG. 1 position;

FIG. 3 is an elevational view of the lug nut removal tool taken from the right side of FIG. 2, with the broken lines indicating the locations of the components in the storage position of the tool; and FIG. 4 is a fragmentary sectional view on an enlarged scale taken generally along line 4—4 of FIG. 3 in the direction of the arrows, with portions broken away for purposes of illustration.

DETAILED DESCRIPTION OF THE INVENTION

Referring now to the drawings in more detail, numeral 10 generally designates a tool which serves to remove and install lug nuts of the type that commonly secure wheels on vehicle axles. The tool 10 has a stand which includes a circular base 12 and a leg 14 which extends from the base 12. The base may be applied to the ground or roadway, and the leg 14 is connected with the base such that it extends vertically above the ground or roadway when the base is applied thereto. The base 12 is large enough support the tool in a stable position on the support surface. The leg 14 may take the form of a cylindrical pipe which has a threaded connection at its lower end with the center of the base 12.

A mounting block which is mounted on the leg 14 takes the form of a clamp which is generally identified by numeral 16 and which includes a clamp body 18, a stack of canted plates 20 (which may be four in number), and a spring 22 (see FIG. 2) which continuously urges the stacked plates 20 toward a canted or clamping position with respect to the leg 14. The clamp 16 may be a conventional bar type clamp which is applicable to the leg 14 with the leg extending slidably through the center of the clamp body 18. The stacked plates 20 may be moved to a release position of the clamp by pushing the projecting ends of the plates against the force applied by the spring 22. In the release position, the clamp body 18 may be freely slid along the length of the leg 14. When the plates 20 are released, the spring 22 immediately moves them to a clamping position in which the plates are disposed at an angle in order to grip the leg 14 and thus secure the clamp body 18 against sliding movement on the leg by the clamping action provided by the plates.

The top surface of the clamp body 18 is provided with a flange 24 on which a fixed channel bracket 26 is rigidly mounted. The lower edge of bracket 26 may be welded or otherwise suitably secured on top of the flange 24. Another channel bracket 28 forms a pivot bracket which is mounted back to back with bracket 26. The two brackets 26 and 28 are pivotally connected by a pivot coupling 30. As best shown in FIG. 4, the pivot coupling 30 has a collar 32 which fits loosely in an opening formed in the web of bracket 26. A threaded shank portion 34 of pivot coupling 30 is threaded into the web of the pivot bracket 28. Consequently, the pivot bracket 28 is able to pivot relative to bracket 26 about the axis of the pivot coupling 30. It is noted that the axis of coupling 30 is oriented perpendicular to the longitudinal axis of the support leg 14.

The pivot bracket 28 supports a lug wrench having a wrench bar 36 and a wrench head 38. The wrench head 38 is carried on one end of bar 36 and may be a conventional hexagonal socket which mates with hexagonal lug nuts when applied thereto. The wrench bar 36 is preferably a cylindrical bar which fits loosely through aligned openings 40 (one of which is shown in FIG. 4) formed through the two flanges of the pivot bracket 28. The wrench bar 36 is able to slide axially in the openings 40, and it is also able to rotate axially in the openings.

The end of the wrench bar 36 opposite the wrench head 38 is equipped with an elongated handle 42. The handle 42 is a rigid member which may be formed by parallel plates connected by rigid brace plates 44 distributed along the length of the handle. A pivot pin 46 is used to connect one end of the handle 42 with the end of the wrench bar 36. The handle 42 is pivotal relative to the bar 36 about the axis of the pivot pin 46, and the pivot pin axis is perpendicular both to the longitudinal axis of bar 36 and to the longitudinal axis of handle 42.

In use, the lug nut removal tool 10 is set up by attaching the support leg 14 to the base 12 and applying the base to a support surface such as the ground or a roadway (as shown in FIG. 1) at a location next to a wheel 48 equipped with a plurality of conventional lug nuts 50 which are threaded onto mounting studs to hold the wheel on its axle. The clamp 16 is adjusted up or down along the length of the support leg 14 until the lug wrench is at the proper height for application to the particular lug nut 50 which is to be loosened or tightened. Then, with the wrench bar 36 in a horizontal orientation, the wrench is slid inwardly on bracket 28 until the wrench head 38 mates with and fits over the lug nut 50. The handle 42 is oriented perpendicular to the wrench bar 36 and, if the lug nut is to be loosened, the free end of the handle 42 is rotated in the proper direction to turn the wrench in a direction to loosen the nut 50. By virtue of the pivot connection provided by pin 46, the handle 42 can be rotated through an arc of approximately 180° while remaining generally perpendicular to bar 36 and then pivoted back to its initial position about the axis of pin 46 prior to effecting another 180° stroke of the handle which loosens or tightens the lug nut, depending upon the direction the handle is rotated.

It is pointed out that the base 12 can be moved from side to side and the clamp 16 can be raised and lowered such that the wrench can be aligned one by one with each of the lug nuts 50. Thus, all of the lug nuts can be quickly and easily loosened in order to permit removal of the tire and quickly and easily tightened after the spare tire has been mounted on the axle. The stand holds the lug wrench at the proper height to mate with the lug nut, and the user is thus required only to rotate the handle 42, thus greatly facilitating the changing of a wheel. The wrench bar 36 can slide axially for application of the wrench head 38 to each nut and withdrawal after the nut has been loosened or tightened. Bar 36 can also rotate axially as required for the wrench head to turn in order to tighten and loosen the nuts.

When not in use, the tool 10 can be stored in a compact position which minimizes the space required for its storage. In the storage position which is shown in broken lines in FIG. 3, the pivot bracket 28 is pivoted through an arc of 90° until the axis of the wrench bar 36 is parallel to the leg 14. The handle 42 is pivoted about pin 46 until it is also parallel to the axis of the support leg 14. Consequently, in the storage position of the tool, the lengthy components are all parallel to one another and their is no significant projection laterally from the tool, and this allows it to be stored without occupying an undue amount of space. It should be noted that the base 12 can be threaded off of the support leg 14 if desired. It should also be noted that the handle 42 can be folded back on the wrench bar 36 so that the overall length of the handle and wrench in the storage position is substantially the same as the length of the handle 42. The support leg 14 need not have any more length than is required to allow the mounting block (clamp body 18) to be adjusted upwardly far enough to permit the upper lug nuts to be removed from the wheel.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, I claim:

1. A lug nut removal tool comprising:
   a support leg applicable to a support surface in upright extension therefrom;
   a mounting block on said leg slidable lengthwise thereon to permit adjustment of the elevation of the block;
   releasable means for securing said block against sliding movement along the leg;
   a lug wrench head applicable to a lug nut;
   a bar carrying said lug wrench head thereon, said bar extending from said mounting block and being axially rotatable relative thereto to effect turning of the lug wrench head;
   handle means on said bar to facilitate rotation thereof;
   a pivot bracket carrying said bar and permitting axial rotation of the bar relative to said bracket; and
   means for mounting said bracket on said block in a manner permitting the bracket to pivot relative to the block about a pivot axis oriented substantially perpendicular to the leg between a first position wherein the bar extends generally perpendicular to the leg for application of the wrench head to a lug nut and a second position wherein the bar extends generally parallel to the leg for storage when not in use.

2. The tool of claim 1, including a base on said support leg for application to the support surface for stabilization of the leg.

3. The tool of claim 1, wherein:
   said mounting block comprises a clamp body fitted on the leg; and
   said releasable means comprises clamp means for clamping said clamp body rigidly to the leg.

4. The tool of claim 3, wherein said clamp means has a clamping condition wherein the clamp body is clamped to the leg and a release condition wherein the clamp body is released for sliding movement along the leg.

5. The tool of claim 4, including yieldable means for urging said clamp means to the clamping condition.

6. The tool of claim 1, wherein:
   said bar has opposite ends and said wrench head is carried on one of said ends; and
   said handle means comprises an elongate handle connected with the end of said bar opposite said one end thereof for pivoted movement about an axis permitting the handle to pivot between an operating position generally perpendicular to the bar and a storage position generally parallel to the bar.

7. The tool of claim 1, including means for accommodating axial movement of said bar relative to said pivot bracket.

8. The tool of claim 1, wherein:
said bar has opposite first and second ends;
said wrench head is mounted rigidly on said first end of the bar; and
said handle means comprises an elongate handle coupled with said second end of the bar for pivotal movement relative to the bar.

9. A lug nut removal tool comprising:
a support leg;
a base connected with said leg and applicable to a support surface to mount the leg in upright extension therefrom;
a mounting block on said leg mounted thereon for axial movement up and down on the leg;
releasable means for securing said mounting block against axial movement along the leg;
a lug wrench head applicable to a lug nut;
a bar on which said wrench head is carried;
means for mounting said bar on said mounting block in a manner permitting axial sliding movement of the bar and axial rotation of the bar to effect turning of the wrench head, said mounting means comprising a pivot bracket to which said bar is coupled in a manner allowing the bar to slide axially and to rotate axially relative to the bracket and means for mounting said bracket on said block for pivotal movement relative thereto about a pivot axis oriented substantially perpendicular to both the leg and bar; and
handle means on said bar to facilitate rotation thereof.

10. The tool of claim 9, wherein said handle means comprises an elongate handle coupled with said bar for pivotal movement relative thereto about an axis mutually perpendicular to said bar and handle.

11. A lug nut removal tool comprising:
a support leg applicable to a support surface in upright extension therefrom;
a mounting block mounted on said leg for sliding movement lengthwise thereon;
releaseable means for securing said block against sliding movement along said leg;
a pivot bracket connected with said mounting block for pivotal movement relative thereto about a pivot axis oriented substantially perpendicular to said leg;
a lug wrench head applicable to a lug nut;
a bar on which said lug wrench head is carried, said bar being mounted on said pivot bracket for axial rotation to effect turning of the wrench head;
said pivot bracket being pivotal about said pivot axis to permit the bar to extend generally perpendicular to the leg for application of the wrench head to a lug nut and to extend generally parallel to the leg for storage when not in use; and
handle means on said bar to facilitate rotation thereof.

12. The tool of claim 11, including a base on said support leg for application to the support surface for stabilization of the leg.

13. The tool of claim 11, wherein said bar is coupled with said pivot bracket for axial sliding movement relative thereto.

14. The tool of claim 11, wherein said handle means comprises an elongated handle coupled with said bar for pivotal movement relative thereto about an axis mutually perpendicular to said bar and handle.

* * * * *